United States Patent [19]

Mares

[11] 4,275,030
[45] Jun. 23, 1981

[54] INJECTION MOLDING ARTICLES OF MORE THAN ONE RESIN COMPONENT

[76] Inventor: Pedro Mares, Sancho de Avila, 105-111, Barcelona, Spain

[21] Appl. No.: 37,213

[22] Filed: May 8, 1979

Related U.S. Application Data

[63] Continuation-in-part of Ser. No. 872,645, Jan. 26, 1978, Pat. No. 4,157,883.

[30] Foreign Application Priority Data

May 10, 1978 [ES] Spain .................................. 469.965

[51] Int. Cl.³ .......................... B29C 5/00; B29F 1/12
[52] U.S. Cl. .................................. 264/250; 264/245; 264/255; 264/294; 264/328.7
[58] Field of Search ............... 264/250, 255, 245, 246, 264/328.1, 294, 328.7; 249/125, 131; 425/130, 257, 129 R, 134, 588, 127

[56] References Cited

U.S. PATENT DOCUMENTS

| 818,286 | 4/1906 | Porten | 264/255 |
| 3,051,994 | 9/1962 | Carozzo | 264/245 |
| 3,632,729 | 1/1972 | Bielfeldt | 264/328.7 |
| 3,859,016 | 1/1975 | McGee et al. | 425/130 |

OTHER PUBLICATIONS 870334 06001961 GBX 425 130
1018894 02001966 GBX 425 130

*Primary Examiner*—W. E. Hoag
*Attorney, Agent, or Firm*—Cushman, Darby & Cushman

[57] ABSTRACT

Method for making an article from plural resin materials including blocking of injection channels with pairs of abutting plates and separating the plates to unblock a channel or channels to permit sequentially injecting different resin compositions.

5 Claims, 4 Drawing Figures

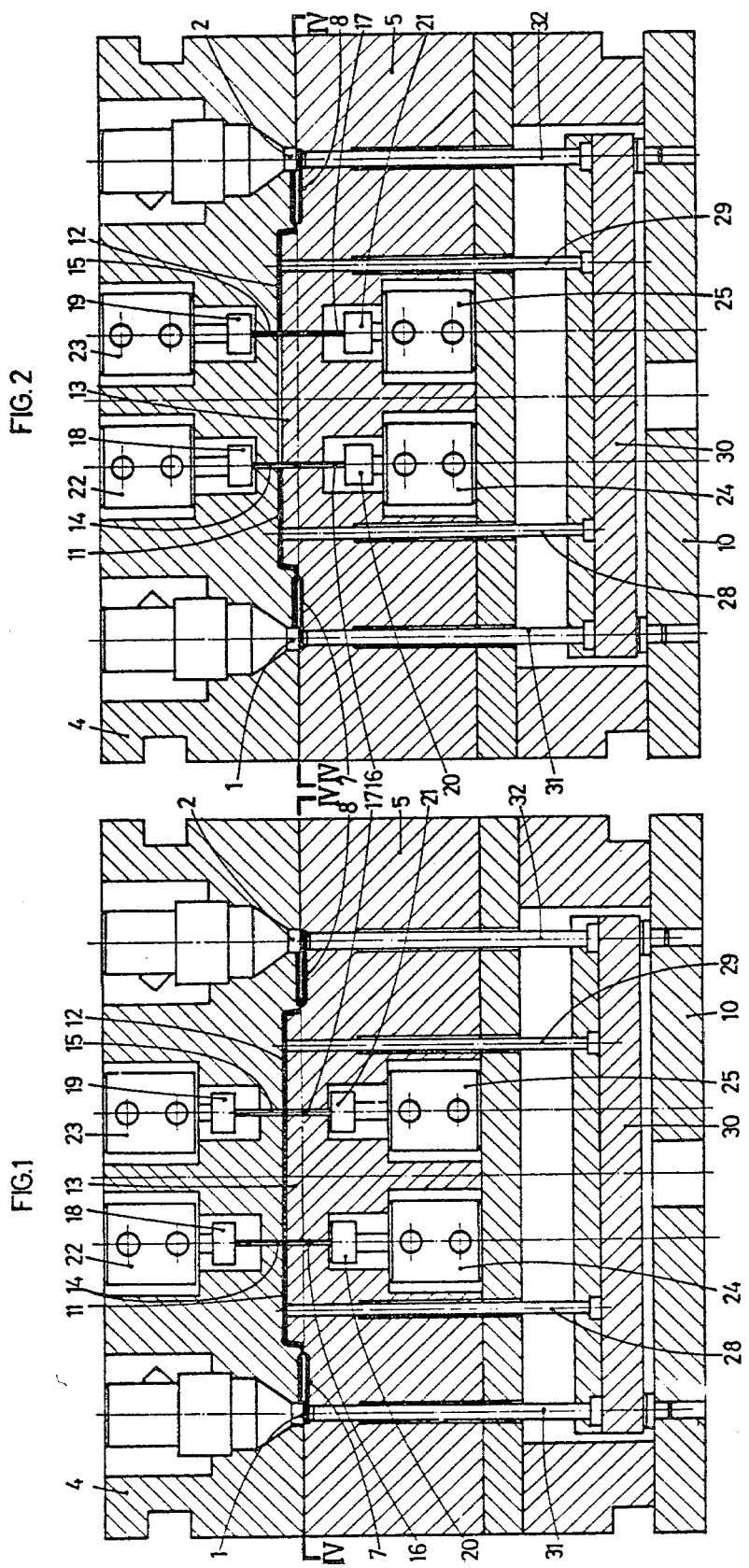

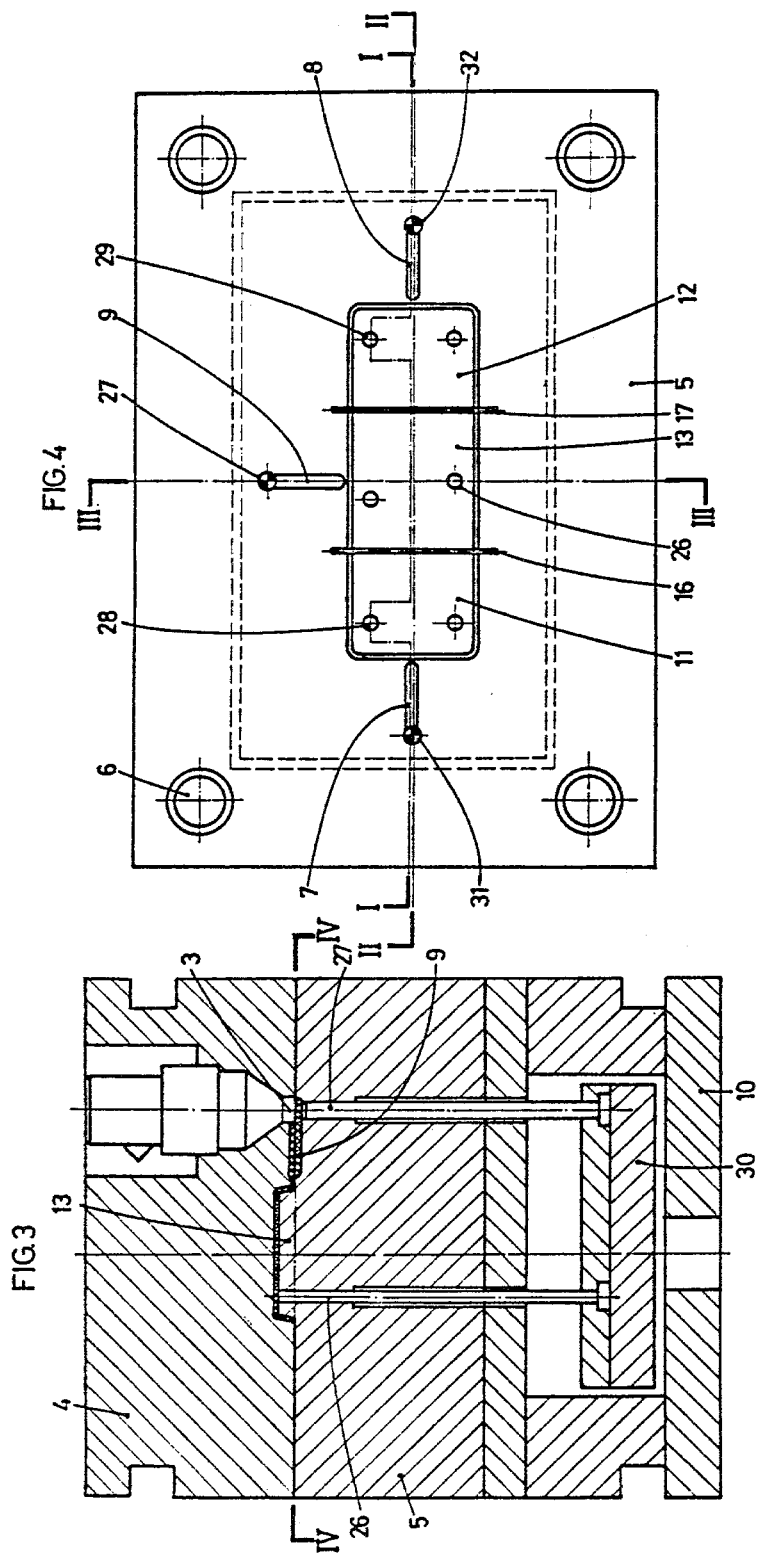

INJECTION MOLDING ARTICLES OF MORE THAN ONE RESIN COMPONENT

The present application refers to improvements introduced into the object of my U.S. patent application Ser. No. 872,645, filed Jan. 26, 1978, now U.S. Pat. No. 4,157,883 issued June 12, 1979, of which this is a continuation-in-part and which refers to improvements applied to the manufacture of pieces of plastic material of a compound structure.

The said Patent refers to the manufacture of pieces of different plastic materials but making up together one unitary structure such that the pieces are produced in a cycle of successive operations of injection molding, examples mentioned in the preamble of the said Patent being pieces consisting of two materials of different colors, relating in the case considered to the translucid sections of the front or tail indicator lights for vehicles.

The application to which this is the preamble refers, within a similar sequence of operations, to the manufacture of pieces of plastic material consisting of three components, which are injected individually but in coordinated operations which will enable to be produced pieces which are more complex than those resulting from the application of the principal Patent, with a comparable saving in time and in labor.

In this case it is a question of injecting three different pieces materials so as to form as many sections in a piece of compound structure such that the said sections join together, forming a single structure of which the components are inseparable from each other.

This invention retains the principles in my said Patent of the independent injection of the various materials, the physical separation of the zones thereof by means of the movement of blades in the form of blocking screens, the moving away of these once the injection of the first materials is completed so as to allow, while the materials are still in a soft state, following the injection of a third material whose leading surface will make contact with the first materials, the plastic welding of the same at their contact areas, thus resulting in one integrated body of which the components cannot be separated one from another.

To assist in the explanation, accompanying this specification are drawings which represent an illustrative but nonlimiting example of one embodiment of the improvements to the object of the U.S. Pat. No. 4,157,883.

In these drawings:

FIGS. 1 and 2 are cross sections through the vertical planes which pass through the centre line of the injection nozzles, and the top and bottom molds used for carrying out the said operation, the said FIGURES corresponding to two different moments in the process in which the blades or movable screens appear in different positions.

FIG. 3 shows a vertical cross section of the top and bottom mold corresponding to a third nozzle which is parallel to but not in line with the previously mentioned ones.

FIG. 4 is a plan view of the injection device on a plane shown as IV—IV in FIGS. 1, 2, and 3 which in turn correspond to the planes shown as I—I, II—II, and III—III respectively in the said plan view.

DETAILED DESCRIPTION OF THE DRAWINGS

The numbered items in the drawings correspond to the following parts;

1, 2, and 3, injection nozzles, being as many as there are different plastic materials though two of them, for example 1, and 2, can be fed with material of the same type but being separate from the material entering through nozzle 3, but will, for the case under consideration, be different materials at least insofar as the respective zones occupied within the space defined between the upper mold 4, and the lower mold 5, of the injection machine are concerned. 6, guide pins for the top and bottom molds; 7, 8, and 9, conduits for the supply of material from the nozzles to the spaces to be filled; 10, base of the injection machine being the bolster for the lower mold; 11, 12, and 13, space occupied by the entering materials in their fluid state, coming from nozzles 1, 2, and 3, respectively;

14, and 15, 16, and 17, blades or movable screens, integral respectively with pistons 18, and 19, 20, and 21, belonging to the cylinders 22, and 23, 24, and 25, actioned either by hydraulic fluid or by compressed air as the case may be;

26, and 27, extractor pins in the central zone 13, of the piece; 28, and 29, 31, and 32, extractor pins in the side parts 11, and 12, respectively; 30, a mobile component part of the machine for the extraction of the pieces;

The operational cycle of the injection process for the piece carried out in the injection molds in accordance with the above described improvements can be summarized as under;

1. Entry of the material from the exterior through the nozzles 1, and 2, which define the end parts 7, and 8, limited by the blades or movable screens 14, 16, and 15, 17;

2. Entry of the third material through nozzle 3, which will form the central zone 13, such that on reaching the side zones and making contact with the internal edges of the first zones 11, and 12, a contact weld will occur between the different materials;

3. Movement of the blades or screens by moving pistons 18, and 19, 20, and 21 so that the inside edges of the recently injected parts 11, and 12, are left free to allow said contact weld;

4. Once the time necessary for the solidification of the plastic materials has elapsed, depending on the nature and characteristics thereof, dismantling of, and extractions from, the mold in the usual manner.

I claim:

1. In a process for injection molding a compound structure having at least three serially disposed zones connected to form a single body, the molding being accomplished in a mold having at least three serially disposed adjoining cavities corresponding to said zones and connecting by passageways, the improvement comprising:
    (1) filling said passageways between each of the outer end cavities and the respective adjoining cavity with a respective pair of movable abutting plates each having three uniformly spaced adjacent side and end edges for forming a passageway mold cavity,
    (2) moving each said plate pair from a non-passageway-blocking position to a position for blocking the respective passageways, (3) injecting respective thermoplastic materials into both of the outer end and adjoining cavities at different times, and (4) moving said pairs of abutting plates to position said passageway mold cavities respectively inbetween said adjoining and end cavities for unblocking the respective passageways blocked in step (2) while the thermoplastic material flat injected in step (3) is weldable to, upon contact with, the thermoplastic material last injected in step (3) to cause contact welding between the thermoplastic materials in the outer end and adjoining cavities and the development in said passageway mold cavities of respective uniform walled connections between said compound structure zones.

2. In a process for injection molding a compound structure having at least three serially disposed zones connected to form a single body, the molding being accomplished in a mold having at least three serially disposed adjoining cavities corresponds to said zones and connected by passageways, the improvement comprising:

(1) filling said passageways between each of the outer end cavities and the respective adjoining cavity with a respective pair of movable abutting plates each having three uniformly spaced adjacent side and end edges for forming a passageway mold cavity, (2) moving each said plate pair from a non-passageway-blocking position to a position for blocking the respective passageways, (3) injecting respective thermoplastic materials into said outer end cavities, (4) injecting respective thermoplastic material into the respective cavity adjoining each said outer end cavity at a time different than when the said injecting occurs in step (3), and (5) moving said pairs of abutting plates to position said passageway mold cavities respectively inbetween said adjoining and end cavities for unblocking the respective passageways blocked in step (2) while the thermoplastic material injected during the first of steps (3) and (4) to occur is still weldable to, upon contact with, the thermoplastic material injected during the later occurring one of those steps (3) and (4) to cause contact welding between the thermoplastic materials in the other end and adjoining cavities and the development in said passageway mold cavities of respective uniform walled connections between said compound structure zones.

3. A process as in claim 1 or 2 wherein the injections into said outer end cavities are substantially simultaneous.

4. A process as in claim 1 and 2 wherein said outer end cavities have said materials injected into them before their respective adjoining cavity.

5. A process as in claim 4 wherein the injections into said outer end cavities are substantially simultaneous.

* * * * *